United States Patent
Aides et al.

(10) Patent No.: US 10,834,295 B2
(45) Date of Patent: Nov. 10, 2020

(54) ATTENTION MECHANISM FOR COPING WITH ACOUSTIC-LIPS TIMING MISMATCH IN AUDIOVISUAL PROCESSING

(71) Applicant: International Business Machines Corporation, Armonk, NY (US)

(72) Inventors: Amit Aides, Haifa (IL); Hagai Aronowitz, Modiin (IL); David Dov, Kibutz Afikim (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/115,573

(22) Filed: Aug. 29, 2018

(65) Prior Publication Data
US 2020/0076988 A1 Mar. 5, 2020

(51) Int. Cl.
*H04N 7/173* (2011.01)
*H04N 5/04* (2006.01)
(Continued)

(52) U.S. Cl.
CPC ............ *H04N 5/04* (2013.01); *G06F 16/489* (2019.01); *G06K 9/00711* (2013.01);
(Continued)

(58) Field of Classification Search
CPC ............... H04N 21/233; H04N 21/234; H04N 21/23418
See application file for complete search history.

(56) References Cited

U.S. PATENT DOCUMENTS

| 7,084,898 B1* | 8/2006 | Firestone ............... H04N 7/152 348/14.08 |
| 2004/0088726 A1* | 5/2004 | Ma ........................... G06T 7/00 725/46 |

(Continued)

FOREIGN PATENT DOCUMENTS

CN 104537358 4/2015

OTHER PUBLICATIONS

Ren, "Audio-Visual Football Video Analysis; From Structure Detection to Attention Analysis", 2007, PhD Dissertation, Faculty of Mathematics and Information Science, University of Glasgow.
(Continued)

*Primary Examiner* — Gigi L Dubasky
(74) *Attorney, Agent, or Firm* — Gregory J. Kirsch

(57) ABSTRACT

Embodiments of the present systems and methods may provide techniques for handling acoustic-lips timing mismatch in audiovisual processing. In embodiments, the context-dependent time shift between the audio and visual streams may be explicitly modeled using an attention mechanism. For example, in an embodiment, a computer-implemented method for determining a context-dependent time shift of audio and video features in an audiovisual stream or file may comprise receiving audio information and video information of the audiovisual stream or file, processing the audio information and video information separately to generate a new representation of the audio information, including information relating to features of the audio information, and a new representation of the video information, including information relating to features of the video information, and mapping features of the audio information and features of the video information using an attention mechanism to identify synchronized pairs of audio and video features.

17 Claims, 4 Drawing Sheets

(51) Int. Cl.
*G06K 9/62* (2006.01)
*G10L 25/24* (2013.01)
*G10L 25/30* (2013.01)
*G06K 9/00* (2006.01)
*G10L 25/57* (2013.01)
*G06N 20/00* (2019.01)
*G06F 16/48* (2019.01)

(52) U.S. Cl.
CPC ........... *G06K 9/6262* (2013.01); *G06N 20/00* (2019.01); *G10L 25/24* (2013.01); *G10L 25/30* (2013.01); *G10L 25/57* (2013.01)

(56) References Cited

U.S. PATENT DOCUMENTS

| | | | | |
|---|---|---|---|---|
| 2006/0123063 | A1* | 6/2006 | Ryan | G06F 16/40 |
| 2011/0234902 | A1* | 9/2011 | Shenoi | H04L 7/005 |
| | | | | 348/515 |
| 2012/0033949 | A1* | 2/2012 | Lu | G11B 27/034 |
| | | | | 386/285 |
| 2013/0141643 | A1* | 6/2013 | Carson | H04N 21/4307 |
| | | | | 348/515 |
| 2013/0162902 | A1* | 6/2013 | Musser, Jr. | H04N 21/4307 |
| | | | | 348/515 |
| 2016/0314789 | A1* | 10/2016 | Marcheret | G10L 15/25 |

OTHER PUBLICATIONS

Evangelopoulos et al., "Audiovisual Attention Modeling and Salient Event Detection", Multimodal Processing and Interaction: Audio, Video, Text, Springer-Verlag, 2008, pp. 179-199.

Chung et al., "Lip Reading Sentences in the Wild", IEEE Conference on Computer Vision and Pattern Recognition (CVPR), 2017.

\* cited by examiner

ATTENTION MECHANISM FOR COPING WITH ACOUSTIC-LIPS TIMING MISMATCH IN AUDIOVISUAL PROCESSING

BACKGROUND

The present invention relates to techniques for handling speech/lips timing mismatch in audiovisual processing.

Audiovisual media, such as digital video streams, typically include one or more audio streams and one or more visual streams. Such an audiovisual input may be processed to perform speech recognition, person recognition, synchrony detection, emotion recognition, etc. A fundamental challenge is that the audio and visual streams are inherently not perfectly synchronized due to the mechanical mechanism of speech production. In fact, the time shift between the two streams is context dependent. This time shift may severely degrade the performance of audiovisual processing. Conventional solutions to this problem, such as—speech synchrony detection techniques, audiovisual lip reading techniques, etc., do not adequately solve this problem. Such conventional techniques typically either "live with" the problem or partly bypass it.

Accordingly, a need arises for techniques that may provide an improved solution to the problem of speech-lips timing mismatch in audiovisual processing.

SUMMARY

Embodiments of the present systems and methods may provide techniques for handling speech-lips timing mismatch in audiovisual processing. In embodiments, the context-dependent time shift between the audio and visual streams may be explicitly modeled using an attention mechanism. The attention mechanism may model the context-dependent time shift and may incorporate the modeling into the audiovisual processing system. Using such techniques may provide improved performance, for example, for synchrony detection.

For example, in an embodiment, a computer-implemented method for determining a context-dependent time shift of audio and video features in an audiovisual stream or file may comprise receiving audio information and video information of the audiovisual stream or file, processing the audio information and video information separately to generate a new representation of the audio information, including information relating to features of the audio information, and a new representation of the video information, including information relating to features of the video information, and mapping features of the audio information and features of the video information using an attention mechanism to identify pairs of audio and video features.

In embodiments, the method may further comprise generating an audio stack from the audio information and generating a video stack from the video information. The audio stack may comprise mel-frequency cepstral coefficients generated from the audio information and the video stack comprises a plurality of frames of video information. The processing may comprise processing the audio information using a machine learning method modeling the context-dependent time shift and processing the video information using a machine learning method modeling the context-dependent time shift. The audio machine learning method may use a gated recurrent units network that uses a plurality of consecutive outputs of the audio gated recurrent units network combined using a weighted function summed to one such that a different weight is given to each one of the consecutive audio frames, the video machine learning method uses a gated recurrent units network that uses a plurality of consecutive outputs of the video gated recurrent units network combined using a weighted function summed to one such that a different weight is given to each one of the consecutive video frames, and the attention mechanism uses a weighted sum of a plurality of audio frames and video frames and weights of the attention mechanism are based on a content and context of the audio information and on a content and context of the video information. The pairs of audio and video features may be identified as being true (synchronized) features or false (unsynchronized) features. The method may further comprise generating synthetic video information that is synchronized to the received audio information based on temporal features detected in the audio by generating matching visual features that provide temporal correspondence as synchronized features In an embodiment, a system for determining a context-dependent time shift of audio and video features in an audiovisual stream or file may comprise a processor, memory accessible by the processor, and computer program instructions stored in the memory and executable by the processor to perform receiving audio information and video information of the audiovisual stream or file, processing the audio information and video information separately to generate a new representation of the audio information, including information relating to features of the audio information, and a new representation of the video information, including information relating to features of the video information, and mapping features of the audio information and features of the video information using an attention mechanism to identify pairs of audio and video features.

In an embodiment, a computer program product for determining a context-dependent time shift of audio and video features in an audiovisual stream or file may comprise a non-transitory computer readable storage having program instructions embodied therewith, the program instructions executable by a computer, to cause the computer to perform a method comprising receiving audio information and video information of the audiovisual stream or file, processing the audio information and video information separately to generate a new representation of the audio information, including information relating to features of the audio information, and a new representation of the video information, including information relating to features of the video information, and mapping features of the audio information and features of the video information using an attention mechanism to identify pairs of audio and video features.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques for handling speech-lips timing mismatch in audiovisual processing. In embodiments, the context-dependent time shift between the audio and visual streams may be explicitly modeled using an attention mechanism. The attention mechanism may model the context-dependent time shift and may incorporate the modeling into the audiovisual processing system. Using such techniques may provide improved performance, for example, for synchrony detection.

In deep neural networks, the attention mechanism may focus the processing to a selected part of the input—either in the time domain or the spatial domain. In embodiments, a time frame processed in the audio domain and a time frame processed in the visual domain may be associated using a novel application of the attention mechanism.

Embodiments may provide solutions to the problem of audio-visual authentication, where the goal is to identify a person using their audiovisual recordings. A major problem with common authentication approaches is that they are sensitive to attacks. For example, one may bypass an authentication system based on video by showing an image of a different person to the camera. One approach to protect against such attacks is to identify whether the audio and the video recordings are synchronized, which may be provided by embodiments of the present techniques. Specifically, an audio-visual pair of streams may be classified into a positive pair if they contain a synchronized recording of a speaker, or the pair of streams may be classified into a false pair if the video and audio are not synchronized, for example, they are of the same speaker but the audio is not taken at the same time and includes a different content.

Figure 1:
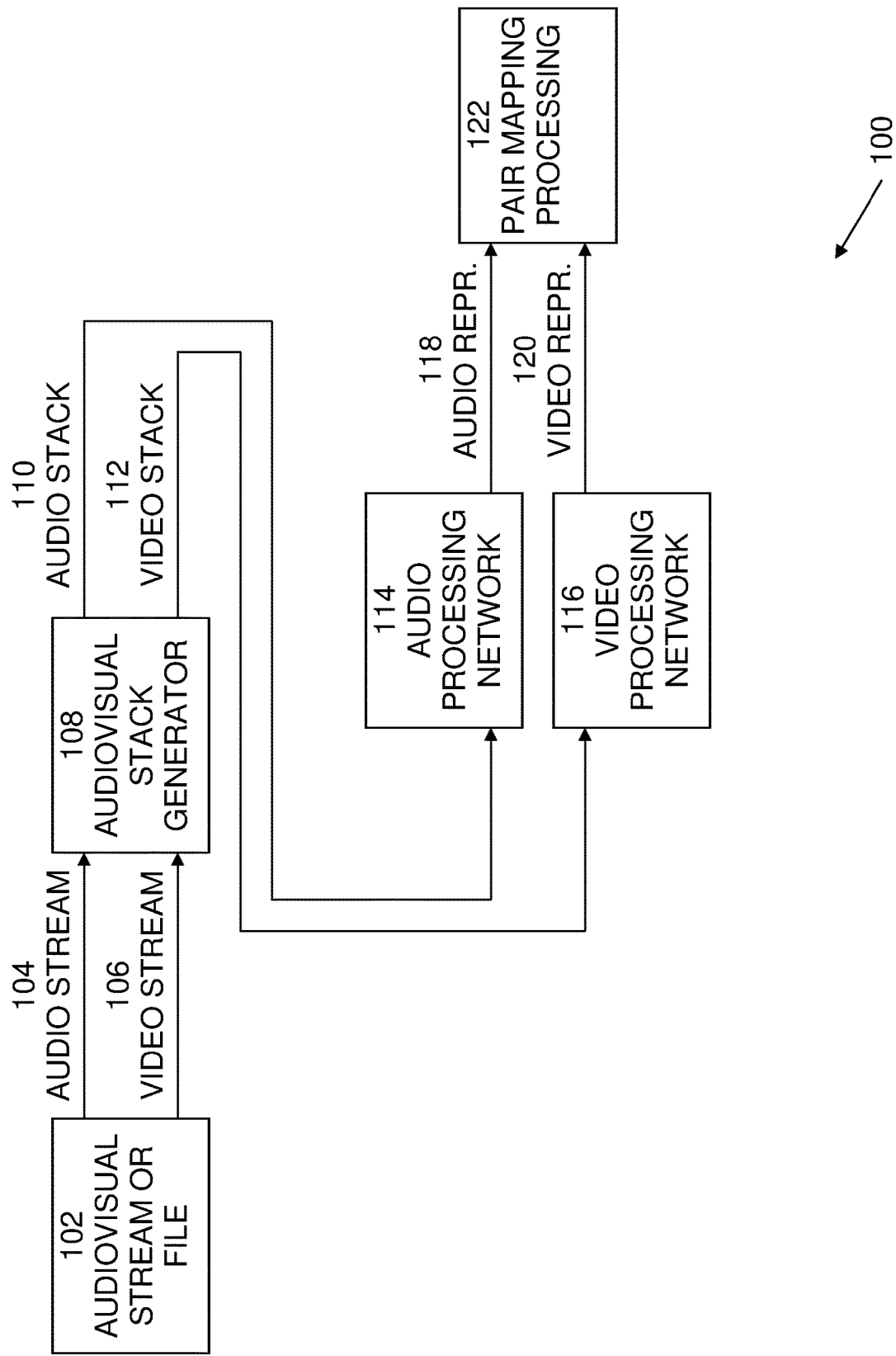
FIG. 1 illustrates an exemplary system in which the present systems and methods may be implemented.
Figure 3:
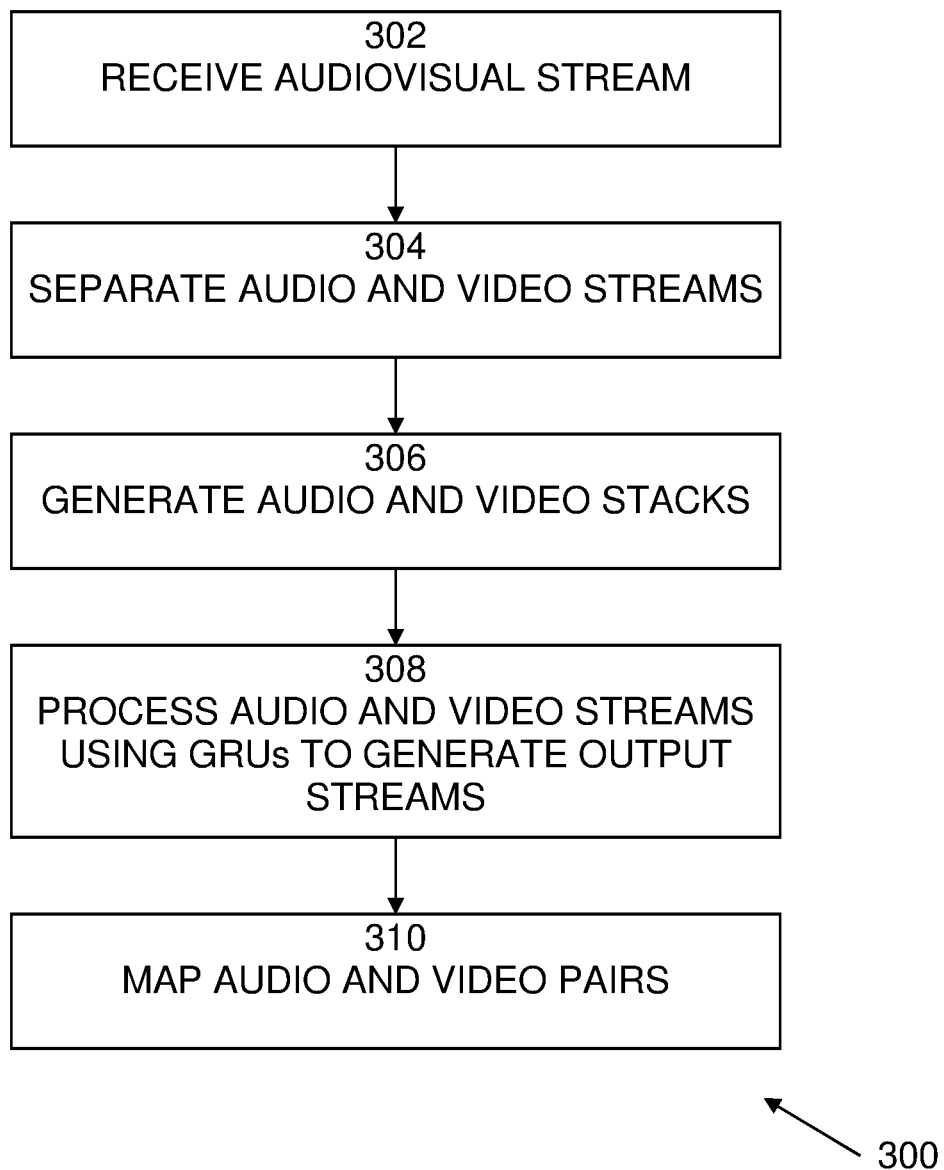
FIG. 3 is an exemplary flow diagram of a process 300, which may implement embodiments of the present methods, and which may be implemented in embodiments of the present systems.

An exemplary system 100 in which the present systems and methods may be implemented is shown in FIG. 1. It is best viewed in conjunction with FIG. 3, which is an exemplary flow diagram of a process 300, which may implement embodiments of the present methods, and which may be implemented in embodiments of the present systems. As shown in this example, an audiovisual stream or file 102 may be input for processing and received at 302. Audiovisual stream or file 102 may include an audio stream (or file portion) 104 and a video stream (or file portion) 106. At 304, the audio and video streams may be separated, if necessary. Many formats of audiovisual streams or files include both audio and video information, which may be interleaved for timing purposes. If this is the case, the audio and video streams may be separated to form a distinct audio stream (or file portion) 104 and a distinct video stream (or file portion) 106. At 306, audio and video stacks may be generated by audio stack generator 108 from distinct audio stream (or file portion) 104 and a distinct video stream (or file portion) 106.

The input to the processing networks 114, 116 may be audio and video stacks 110, 112, which may be generated at 306 by audio stack generator 108. At 308, audio stack 110 may be input to, and processed by, audio processing network 114 and video stack 112 may be input to, and processed by, video processing network 116. For example, audio processing network 114 may be fed with an audio stack 110 including a representation of the audio. For example, audio stack 110 may include mel-frequency cepstral coefficients (MFCCs) representing 20 time frames from an audio stream at 100 fps. The mel-frequency cepstrum (MFC) is a representation of the short-term power spectrum of a sound. The MFCCs are coefficients that collectively make up an MFC Likewise, for example, video processing network 116 may be fed with video stack 112 including 5 frames of 120×120 pixels of a video stream at 25 fps. In this setting, the output streams 110, 112 of the processing networks 108 may be seen as a new representation of audiovisual stream 102 corresponding to a sequence of 200 ms length. It is to be noted that the use of MFCCs, as well as the particular frame rates, frame lengths, pixel resolutions, etc., are merely examples. Other representations and formats, such as raw audio, spectrograms, etc., as well as other rates, lengths, sizes, and resolutions, may be used by the present systems and methods as well.

In embodiments, audio processing network 114 and video processing network 116 may each be based on a gated recurrent units (GRUs) network. GRUs are mechanisms that may be used in recurrent neural networks and have utility in, for example, music and speech modeling. An inherent feature of GRUs is an error or loss function. An example of a loss function that may be used is:

$$E = \frac{1}{2N} \sum_{n=1}^{N} (y_n) d_n^2 + (1 - y_n) \max(\text{margin} - d_n, 0)^2$$

$$d_n = \|v_n - a_n\|_2$$

Accordingly, output streams 118, 120 may include data representing audiovisual pairs. At 310, output streams 118, 120 may be fed to pair mapping processing 122, which may determine the mapping of audio and video pairs in output streams 118, 120. Pair mapping processing may map audio and video pairs to identify synchronized (true) pairs and unsynchronized (false) pairs. In output streams 118, 120, synchronized (true) pairs may map close to each other, while the false pairs are mapped distantly. In this example, the context-dependent time shift between the audio and visual streams may be explicitly modeled using an attention mechanism to detect synchronized (true) pairs and unsynchronized (false) pairs. In embodiments, using attention for modeling the fine temporal correspondence between audio and visual streams may be utilized, for example, for synchrony detection and for synthetic lip-syncing. For example, given input audio, a synchronized synthetic video may be generated based on the temporal features detected in the audio by generating matching visual features that provide the appropriate temporal correspondence.

Figure 2:
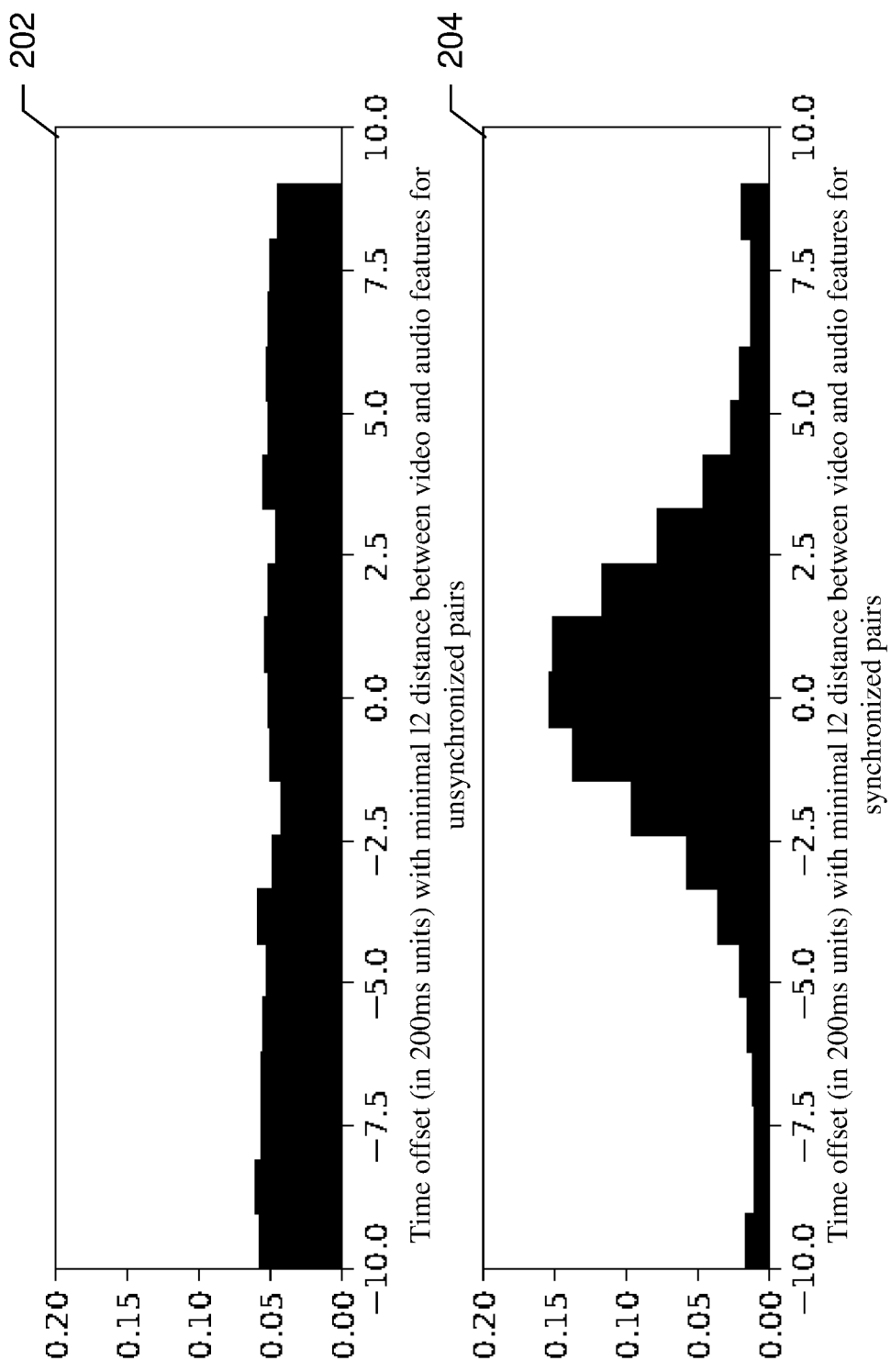
FIG. 2 shows exemplary histograms of the time offsets with minimal 12 distance between video and audio representations for synchronized and unsynchronized pairs in output streams.

Exemplary histograms of the time offsets (distances) between audiovisual representations of synchronized (true) and unsynchronized (false) pairs in output streams 118, 120 are shown in FIG. 2. In this example, false audio-visual pairs are shown at 202 and true audio-visual pairs are shown at 204. As may be seen from this example, there exist many cases for which the smallest distance between audio and video is obtained between pairs, where the audio is shifted by a few (audio) frames with respect to video even though a true (synchronized) audio-visual pair is considered. This phenomenon might relate to slight mis-synchronization in the original (true) recordings. Another explanation may be a phenomenon called co-articulation occurring in natural continuous speech. During pronunciation of a particular phoneme, the mouth naturally prepares itself to pronounce the next phoneme so that the position of the mouth and lips precede the production of the next sound. On the other hand, there are phonemes at which the mouth lags behind the sound. FIG. 2 indicates that a better distinction between synchronized and unsynchronized pair may be achieved by incorporating several consecutive audio frames for the decision.

Embodiments of the present systems and methods may be based on recurrent neural networks (RNN). Examples of different RNN architectures may include the classical RNN, the long-short term memory (LSTM) network, and the gated recurrent unit (GRU). In the examples described herein, the GRU is used. However, the classical RNN and LSTM networks may be used, as well as other techniques.

In embodiments, the representation of the audio signal may be obtained using several consecutive outputs of the audio GRU network. For example, the consecutive outputs may be combined using a weighted function summed to one such that a different weight is given to each one of the consecutive audio frames. The weights may be content based and they may be implemented as a soft max layer leading to an improvement of the GRU architecture with negligible effect on the evaluation time.

For the example of the GRU, the input of the audio signal at frame n may be denoted by $\alpha_n$, a single GRU cell of the audio network is described by the following equations:

$$z_n = \sigma(W_z \cdot [\alpha_{n-1}, \alpha_n]);$$

$$r_n = \sigma(W_r \cdot [\alpha_{n-1}, \alpha_n]);$$

$$s_n = \tan h(W_s \cdot [r_n * \alpha_{n-1}, \alpha_n]);$$

$$\alpha_n = (1 - z_n) * \alpha_{n-1} + z_n * s_n;$$

where $\sigma$ is the sigmoid function and $[\cdot, \cdot]$ and $*$ denote concatenation and point wise multiplication, respectively. $\alpha_n$ is called the hidden state; it stores the state (memory) of the sequence up to frame n, and also embodies the output of the cell. Roughly, $z_n$ and $r_n$ control the amount of information related to the previous state and the current input, which are passed to the output of the cell.

In embodiments, audio processing network 114 and video processing network 116 may use two similar networks, which may be trained using the Siamese networks procedure. For training, the networks, for example, may be fed with the audio and the video signals, which are collected into stacks of, for example, 20 and 5 frames, respectively, such that each stack represents a sequence of ~200 ms. Two types of stacks may be considered: a synchronized (true) stack, in which the audio and the video correspond with one another, and an unsynchronized (false) stack in which the audio and the video do not correspond with one another. For example, the unsynchronized stacks may be obtained by randomly shifting the video signal with respect to audio by, for example, 2-10 frames. The output of the video network at frame n may be denoted as $v_n$. The loss function, denoted by E, may be defined, as:

$$E = y\|v - a\|^2 + (1 - y)\max(M - \|v - a\|, 0)^2,$$

where the time indices are removed for simplicity, y is an indicator function which equals one for synchronized stacks and zero for unsynchronized, and M is a constant factor used along with the max function to avoid negative loss. Using the loss function, the Siamese networks may be trained to map the audio and the video signals into a mutual domain in which authentic audio and video recordings are mapped close to each other, while deception recordings are mapped distantly.

In embodiments, the Siamese recurrent networks may be improved by introducing an attention mechanism, for which the new output of the network, which may be denoted by $\bar{\alpha}_n$, may be given by a weighted sum of several consecutive frames:

$$\bar{a}_n = \sum_{l=-L}^{L} \frac{e^{\omega_l a_{n+l}}}{\sum_{k=-L}^{L} e^{\omega_k a_{n+k}}} a_{n+l},$$

where L is set to 3. The weights $\omega_l$ are learned during training, and the use of a softmax layer makes sure that the weights of the embeddings sum to one. This allows training of the architecture with the attention mechanism in an end to end manner. In addition, since the weights are obtained as an output of the softmax layer, they are based on the content of the recording so that the network implicitly learns different types of misalignments.

In addition to learning long temporal relations between the samples in each modality, the recurrent architecture has the advantage that the signals may be processed sequentially. Specifically, during the test phase, all outputs of the video signal may be used along with the corresponding audio outputs for liveness detection. The estimated indicator of the liveness of an audio-visual recording of N video frames, which is denoted by $\hat{y}$, is given by:

$$\hat{y} = \begin{cases} 1; & \frac{1}{N}\sum_{n=0}^{N-1}\|v_n - a_{5n+4}\| > \tau \\ 0; & \text{otherwise} \end{cases},$$

where $\tau$ is a parameter that controls the tradeoff between false alarm and correct detection rates and it is selected according to the application at hand. The network is trained with stochastic gradient descent.

Figure 4:
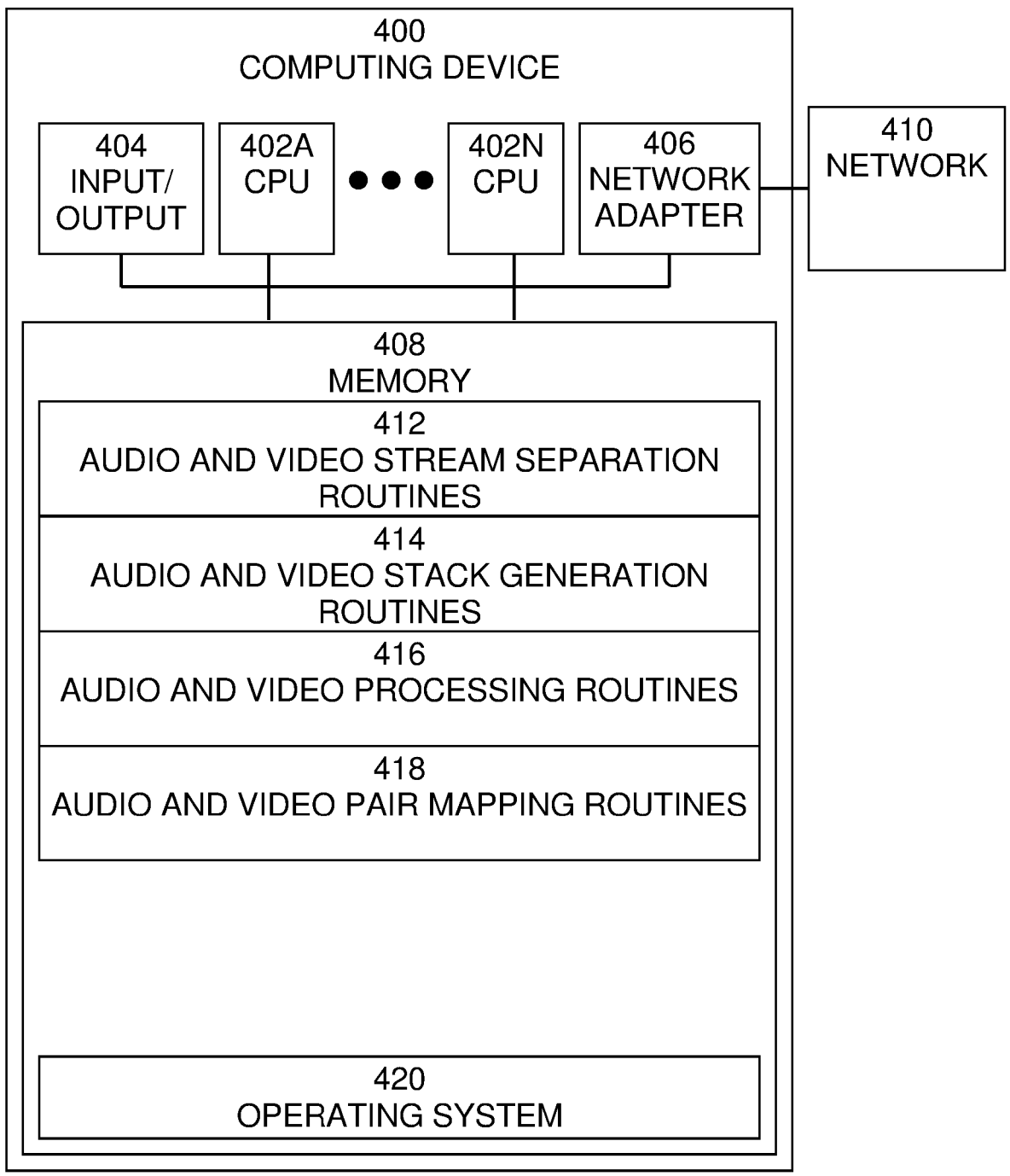
FIG. 4 is an exemplary block diagram of a computer system in which processes involved in the embodiments described herein may be implemented.

An exemplary block diagram of a computer system 400, in which processes involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 4, memory 408 may include audio and video stream separation routines 412, audio and video stack generation routines 414, audio and video processing routines 416, audio and video pair mapping routines 418, and operating system 420. Audio and video stream separation routines 412 may include software routines to receive an audio visual stream or file and generate a separate audio stream and a separate video stream. Audio and video stack generation routines 414 may include software routines to generate an audio stack from the audio stream, as described above, and to generate a video stack from the video stream, as described above. Audio and video processing routines 416 may include software routines to generate output streams that may be new representations of the audio and video streams using, for example GRU networks, as described above. Audio and video pair mapping routines 418 may include software routines to generate information indicating the mapping of audio and video pairs in the output streams and to identify authentic (true) pairs and false pairs. Operating system 420 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for determining a context-dependent time shift of audio and video features in an audiovisual stream or file, the method comprising:
   receiving audio information and video information of the audiovisual stream or file;
   processing the audio information and video information separately to generate a new representation of the audio information, including information relating to features of the audio information, and a new representation of the video information, including information relating to features of the video information; and
   mapping features of the audio information and features of the video information using an attention mechanism modeling the context-dependent time shift to identify pairs of audio and video features, wherein the pairs of audio and video features are identified as being synchronized (true) features that contain a recording of a speaker in which the audio information of the recording and the video information of lips of the speaker are synchronized or unsynchronized (false) features otherwise, and wherein the attention mechanism uses a weighted sum of a plurality of consecutive audio frames and a weighted sum of a plurality of consecutive video frames and weights of the attention mechanism are based on a content and context of the audio information and on a content and context of the video information.

2. The method of claim 1, further comprising:
   generating an audio stack from the audio information; and
   generating a video stack from the video information.

3. The method of claim 2, wherein the audio stack comprises mel-frequency cepstral coefficients generated from the audio information and the video stack comprises a plurality of frames of video information.

4. The method of claim 3, wherein the processing comprises:
   processing the audio information using a machine learning method modeling the context-dependent time shift; and
   processing the video information using a machine learning method modeling the context-dependent time shift.

5. The method of claim 4, wherein:
the audio machine learning method uses a gated recurrent units network that uses a plurality of consecutive outputs of the audio gated recurrent units network combined using a weighted function summed to one such that a different weight is given to each one of the consecutive audio frames; and
the video machine learning method uses a gated recurrent units network that uses a plurality of consecutive outputs of the video gated recurrent units network combined using a weighted function summed to one such that a different weight is given to each one of the consecutive video frames.

6. The method of claim 5, further comprising generating synthetic video information that is synchronized to the received audio information based on temporal features detected in the audio by generating matching visual features that provide temporal correspondence as synchronized features.

7. A system for determining a context-dependent time shift of audio and video features in an audiovisual stream or file, the system comprising a processor, memory accessible by the processor, and computer program instructions stored in the memory and executable by the processor to perform:
receiving audio information and video information of the audiovisual stream or file;
processing the audio information and video information separately to generate a new representation of the audio information, including information relating to features of the audio information, and a new representation of the video information, including information relating to features of the video information; and
mapping features of the audio information and features of the video information using an attention mechanism modeling the context-dependent time shift to identify pairs of audio and video features, wherein the pairs of audio and video features are identified as being synchronized (true) features that contain a recording of a speaker in which the audio information of the recording and the video information of lips of the speaker are synchronized or unsynchronized (false) features otherwise, and wherein the attention mechanism uses a weighted sum of a plurality of consecutive audio frames and a weighted sum of a plurality of consecutive video frames and weights of the attention mechanism are based on a content and context of the audio information and on a content and context of the video information.

8. The system of claim 7, further comprising:
generating an audio stack from the audio information; and
generating a video stack from the video information.

9. The system of claim 8, wherein the audio stack comprises mel-frequency cepstral coefficients generated from the audio information and the video stack comprises a plurality of frames of video information.

10. The system of claim 9, wherein the processing comprises:
processing the audio information using a machine learning method modeling the context-dependent time shift; and
processing the video information using a machine learning method modeling the context-dependent time shift.

11. The system of claim 10, wherein:
the audio machine learning method uses a gated recurrent units network that uses a plurality of consecutive outputs of the audio gated recurrent units network combined using a weighted function summed to one such that a different weight is given to each one of the consecutive audio frames; and
the video machine learning method uses a gated recurrent units network that uses a plurality of consecutive outputs of the video gated recurrent units network combined using a weighted function summed to one such that a different weight is given to each one of the consecutive video frames.

12. The system of claim 11, further comprising generating synthetic video information that is synchronized to the received audio information based on temporal features detected in the audio by generating matching visual features that provide temporal correspondence as synchronized features.

13. A computer program product for determining a context-dependent time shift of audio and video features in an audiovisual stream or file, the computer program product comprising a non-transitory computer readable storage having program instructions embodied therewith, the program instructions executable by a computer, to cause the computer to perform a method comprising:
receiving audio information and video information of the audiovisual stream or file;
processing the audio information and video information separately to generate a new representation of the audio information, including information relating to features of the audio information, and a new representation of the video information, including information relating to features of the video information; and
mapping features of the audio information and features of the video information using an attention mechanism modeling a context-dependent time shift to identify pairs of audio and video features, wherein the pairs of audio and video features are identified as being synchronized (true) features that contain a recording of a speaker in which the audio information of the recording and the video information of lips of the speaker are synchronized or unsynchronized (false) features otherwise, and wherein the attention mechanism uses a weighted sum of a plurality of consecutive audio frames and a weighted sum of a plurality of consecutive video frames and weights of the attention mechanism are based on a content and context of the audio information and on a content and context of the video information.

14. The computer program product of claim 13, further comprising:
generating an audio stack from the audio information; and
generating a video stack from the video information.

15. The computer program product of claim 14, wherein the audio stack comprises mel-frequency cepstral coefficients generated from the audio information and the video stack comprises a plurality of frames of video information.

16. The computer program product of claim 15, wherein the processing comprises:
processing the audio information using a machine learning method modeling the context-dependent time shift; and
processing the video information using a machine learning method modeling the context-dependent time shift;
wherein the audio machine learning method uses a gated recurrent units network that uses a plurality of consecutive outputs of the audio gated recurrent units network combined using a weighted function summed to one such that a different weight is given to each one of the consecutive audio frames; and the video machine learning method uses a gated recurrent units network that uses a plurality of consecutive outputs of the video gated recurrent units network combined using a weighted function summed to one such that a different weight is given to each one of the consecutive video frames.

17. The computer program product of claim 16, further comprising generating synthetic video information that is synchronized to the received audio information based on temporal features detected in the audio by generating matching visual features that provide temporal correspondence as synchronized features.

* * * * *